(12) United States Patent
Nishimura et al.

(10) Patent No.: US 10,055,863 B2
(45) Date of Patent: Aug. 21, 2018

(54) DISPLAY CONTROL SYSTEM, AND DISPLAY CONTROL METHOD FOR VISUAL PRESENTATION DATA

(71) Applicant: FUJITSU LIMITED, Kawasaki-shi, Kanagawa (JP)

(72) Inventors: Takehiko Nishimura, Kawasaki (JP); Kazuki Takahashi, Wako (JP); Ryota Sakaguchi, Itabashi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/977,375

(22) Filed: Dec. 21, 2015

(65) Prior Publication Data

US 2016/0210765 A1 Jul. 21, 2016

(30) Foreign Application Priority Data

Jan. 21, 2015 (JP) ................................. 2015-009738

(51) Int. Cl.
*G06T 11/20* (2006.01)

(52) U.S. Cl.
CPC ........ *G06T 11/206* (2013.01); *G06T 2210/36* (2013.01); *G06T 2210/62* (2013.01)

(58) Field of Classification Search
None
See application file for complete search history.

(56) References Cited

U.S. PATENT DOCUMENTS

| 2007/0070470 | A1 | 3/2007 | Takami et al. | |
| 2011/0084967 | A1* | 4/2011 | De Pauw | G06F 3/0481 345/440 |
| 2011/0153506 | A1* | 6/2011 | Patterson | G06Q 10/06 705/301 |
| 2013/0157688 | A1* | 6/2013 | Kateley | H04W 24/08 455/456.1 |

FOREIGN PATENT DOCUMENTS

| JP | 2001-005522 | 1/2001 |
| JP | 2007-110676 | 4/2007 |
| JP | 2010-250769 | 11/2010 |
| JP | 2014-020857 | 2/2014 |

OTHER PUBLICATIONS

Office Action dated Apr. 4, 2018 for corresponding Chinese Patent Application 201610031076.X, with English Translation, 16 pages.

\* cited by examiner

*Primary Examiner* — Jason Pringle-Parker
(74) *Attorney, Agent, or Firm* — Fujitsu Patent Center

(57) ABSTRACT

A display control system includes: at least a display control device including a transparency control unit that, when displaying a first display component and a second display component such that at least parts of the first display component and the second display component overlap each other, increases a transparency of at least one of the first display component and the second display component in an overlapping portion according to one of a density of display contents contained in the first display component and a density of display contents contained in the second display component in the overlapping portion.

9 Claims, 14 Drawing Sheets

FIG.2

| LOG ID | DATE/TIME | TYPE | PROCESS STATE | TEMPER-ATURE | EVENT CONTENT | ... |
|---|---|---|---|---|---|---|
| 1001 | 2014/12/17 15:05:10 | TRACEABILITY | PROCESS A START | — | — | ... |
| 1002 | 2014/12/17 15:05:10 | TEMPERATURE | — | 32.6°C | — | ... |
| 1003 | 2014/12/17 15:05:11 | TEMPERATURE | — | 32.7°C | — | ... |
| 1004 | 2014/12/17 15:05:12 | TEMPERATURE | — | 33.1°C | — | ... |
| ... | ... | ... | ... | ... | ... | ... |
| 1136 | 2014/12/17 15:20:51 | TRACEABILITY | PROCESS A START | — | — | ... |
| 1137 | 2014/12/17 15:20:51 | TEMPERATURE | — | 40.3°C | — | ... |
| ... | ... | ... | ... | ... | ... | ... |
| 1252 | 2014/12/17 16:55:23 | TEMPERATURE | — | 32.5°C | — | ... |
| 1253 | 2014/12/17 16:55:23 | EVENT | — | — | ERROR | ... |
| ... | ... | ... | ... | ... | ... | ... |
| 1323 | 2014/12/17 17:01:54 | EVENT | — | — | INFORMATION | ... |
| 1324 | 2014/12/17 17:01:54 | TEMPERATURE | — | 30.4°C | — | ... |
| 1325 | 2014/12/17 17:01:55 | TEMPERATURE | — | 30.4°C | — | ... |
| 1326 | 2014/12/17 17:01:56 | TEMPERATURE | — | 30.4°C | — | ... |
| 1327 | 2014/12/17 17:01:57 | TEMPERATURE | — | 30.4°C | — | ... |
| 1328 | 2014/12/17 17:01:58 | TRACEABILITY | PROCESS C START | — | — | ... |
| 1329 | 2014/12/17 17:01:58 | TEMPERATURE | — | 30.4°C | — | ... |
| ... | ... | ... | ... | ... | ... | ... |

| GRAPH TYPE | | TRANSPARENCY ACCORDING TO GRAPH PROPERTY (FIRST TRANSPARENCY) | TRANSPARENCY ACCORDING TO RATIO RELATIVE TO MAXIMUM DRAWING AREA (SECOND TRANSPARENCY) | | TRANSPARENCY ACCORDING TO DENSITY OF ELEMENTS IN PREDETERMINED AREA (THIRD TRANSPARENCY) | | FINAL TRANSPARENCY |
|---|---|---|---|---|---|---|---|
| TRACE | ONE | 0% | | 0% | | 0% | 0% |
| | TWO OR MORE | 50% | | 0% | | 0% | 50% |
| EVENT | EMERGENCY | 20% | LOWER THAN 5% | 0% | MAXIMUM DENSITY: 2<br>MAXIMUM DENSITY: 2 TO 3<br>MAXIMUM DENSITY: 3 TO 5<br>MAXIMUM DENSITY: 5 OR HIGHER | 0%<br>30%<br>50%<br>80% | 20%<br>44%<br>60%<br>84% |
| | | | 5 TO 20% | 20% | MAXIMUM DENSITY: 2<br>MAXIMUM DENSITY: 2 TO 3<br>MAXIMUM DENSITY: 3 TO 5<br>MAXIMUM DENSITY: 5 OR HIGHER | 0%<br>30%<br>50%<br>80% | 36%<br>55%<br>68%<br>87% |
| | | | 20 TO 50% | 50% | MAXIMUM DENSITY: 2<br>MAXIMUM DENSITY: 2 TO 3<br>MAXIMUM DENSITY: 3 TO 5<br>MAXIMUM DENSITY: 5 OR HIGHER | 0%<br>30%<br>50%<br>80% | 60%<br>72%<br>80%<br>92% |
| | | | 50% OR HIGHER | 80% | MAXIMUM DENSITY: 2<br>MAXIMUM DENSITY: 2 TO 3<br>MAXIMUM DENSITY: 3 TO 5<br>MAXIMUM DENSITY: 5 OR HIGHER | 0%<br>30%<br>50%<br>80% | 84%<br>89%<br>92%<br>97% |
| | ERROR | 50% | LOWER THAN 5% | 0% | MAXIMUM DENSITY: 2<br>MAXIMUM DENSITY: 2 TO 3<br>MAXIMUM DENSITY: 3 TO 5<br>MAXIMUM DENSITY: 5 OR HIGHER | 0%<br>30%<br>50%<br>80% | 50%<br>65%<br>75%<br>90% |
| | | | 5 TO 20% | 20% | MAXIMUM DENSITY: 2<br>MAXIMUM DENSITY: 2 TO 3<br>MAXIMUM DENSITY: 3 TO 5<br>MAXIMUM DENSITY: 5 OR HIGHER | 0%<br>30%<br>50%<br>80% | 60%<br>72%<br>80%<br>92% |
| | | | 20 TO 50% | 50% | MAXIMUM DENSITY: 2<br>MAXIMUM DENSITY: 2 TO 3<br>MAXIMUM DENSITY: 3 TO 5<br>MAXIMUM DENSITY: 5 OR HIGHER | 0%<br>30%<br>50%<br>80% | 75%<br>83%<br>88%<br>95% |
| | | | 50% OR HIGHER | 80% | MAXIMUM DENSITY: 2<br>MAXIMUM DENSITY: 2 TO 3<br>MAXIMUM DENSITY: 3 TO 5<br>MAXIMUM DENSITY: 5 OR HIGHER | 0%<br>30%<br>50%<br>80% | 90%<br>93%<br>95%<br>98% |
| | INFORMATION | 90% | LOWER THAN 5% | 0% | MAXIMUM DENSITY: 2<br>MAXIMUM DENSITY: 2 TO 3<br>MAXIMUM DENSITY: 3 TO 5<br>MAXIMUM DENSITY: 5 OR HIGHER | 0%<br>30%<br>50%<br>80% | 90%<br>93%<br>95%<br>98% |
| | | | 5 TO 20% | 20% | MAXIMUM DENSITY: 2<br>MAXIMUM DENSITY: 2 TO 3<br>MAXIMUM DENSITY: 3 TO 5<br>MAXIMUM DENSITY: 5 OR HIGHER | 0%<br>30%<br>50%<br>80% | 92%<br>94%<br>96%<br>98% |
| | | | 20 TO 50% | 50% | MAXIMUM DENSITY: 2<br>MAXIMUM DENSITY: 2 TO 3<br>MAXIMUM DENSITY: 3 TO 5<br>MAXIMUM DENSITY: 5 OR HIGHER | 0%<br>30%<br>50%<br>80% | 95%<br>97%<br>98%<br>99% |
| | | | 50% OR HIGHER | 80% | MAXIMUM DENSITY: 2<br>MAXIMUM DENSITY: 2 TO 3<br>MAXIMUM DENSITY: 3 TO 5<br>MAXIMUM DENSITY: 5 OR HIGHER | 0%<br>30%<br>50%<br>80% | 98%<br>99%<br>99%<br>100% |

FIG.4

| GRAPH TYPE | TRANSPARENCY ACCORDING TO GRAPH PROPERTY (FIRST TRANSPARENCY) | TRANSPARENCY ACCORDING TO RATIO RELATIVE TO MAXIMUM DRAWING AREA (SECOND TRANSPARENCY) | | TRANSPARENCY ACCORDING TO DENSITY OF ELEMENTS IN PREDETERMINED AREA (THIRD TRANSPARENCY) | | FINAL TRANS-PARENCY |
|---|---|---|---|---|---|---|
| HEAT MAP | $x < X_{2.5}$ | 0% | LOWER THAN 5% | 0% | MAXIMUM DENSITY: 2<br>MAXIMUM DENSITY: 2 TO 3<br>MAXIMUM DENSITY: 3 TO 5<br>MAXIMUM DENSITY: 5 OR HIGHER | 0%<br>30%<br>50%<br>80% | 0%<br>30%<br>50%<br>80% |
| | | | 5 TO 20% | 20% | MAXIMUM DENSITY: 2<br>MAXIMUM DENSITY: 2 TO 3<br>MAXIMUM DENSITY: 3 TO 5<br>MAXIMUM DENSITY: 5 OR HIGHER | 0%<br>30%<br>50%<br>80% | 20%<br>44%<br>60%<br>84% |
| | | | 20 TO 50% | 50% | MAXIMUM DENSITY: 2<br>MAXIMUM DENSITY: 2 TO 3<br>MAXIMUM DENSITY: 3 TO 5<br>MAXIMUM DENSITY: 5 OR HIGHER | 0%<br>30%<br>50%<br>80% | 50%<br>65%<br>75%<br>90% |
| | | | 50% OR HIGHER | 80% | MAXIMUM DENSITY: 2<br>MAXIMUM DENSITY: 2 TO 3<br>MAXIMUM DENSITY: 3 TO 5<br>MAXIMUM DENSITY: 5 OR HIGHER | 0%<br>30%<br>50%<br>80% | 80%<br>86%<br>90%<br>96% |
| | $X_{2.5} < x < X_{15}$ | 50% | LOWER THAN 5% | 0% | MAXIMUM DENSITY: 2<br>MAXIMUM DENSITY: 2 TO 3<br>MAXIMUM DENSITY: 3 TO 5<br>MAXIMUM DENSITY: 5 OR HIGHER | 0%<br>30%<br>50%<br>80% | 50%<br>65%<br>75%<br>90% |
| | | | 5 TO 20% | 20% | MAXIMUM DENSITY: 2<br>MAXIMUM DENSITY: 2 TO 3<br>MAXIMUM DENSITY: 3 TO 5<br>MAXIMUM DENSITY: 5 OR HIGHER | 0%<br>30%<br>50%<br>80% | 60%<br>72%<br>80%<br>92% |
| | | | 20 TO 50% | 50% | MAXIMUM DENSITY: 2<br>MAXIMUM DENSITY: 2 TO 3<br>MAXIMUM DENSITY: 3 TO 5<br>MAXIMUM DENSITY: 5 OR HIGHER | 0%<br>30%<br>50%<br>80% | 75%<br>83%<br>88%<br>95% |
| | | | 50% OR HIGHER | 80% | MAXIMUM DENSITY: 2<br>MAXIMUM DENSITY: 2 TO 3<br>MAXIMUM DENSITY: 3 TO 5<br>MAXIMUM DENSITY: 5 OR HIGHER | 0%<br>30%<br>50%<br>80% | 90%<br>93%<br>95%<br>98% |
| | $X_{15} < x < X_{85}$ | 90% | LOWER THAN 5% | 0% | MAXIMUM DENSITY: 2<br>MAXIMUM DENSITY: 2 TO 3<br>MAXIMUM DENSITY: 3 TO 5<br>MAXIMUM DENSITY: 5 OR HIGHER | 0%<br>30%<br>50%<br>80% | 90%<br>93%<br>95%<br>98% |
| | | | 5 TO 20% | 20% | MAXIMUM DENSITY: 2<br>MAXIMUM DENSITY: 2 TO 3<br>MAXIMUM DENSITY: 3 TO 5<br>MAXIMUM DENSITY: 5 OR HIGHER | 0%<br>30%<br>50%<br>80% | 92%<br>94%<br>96%<br>98% |
| | | | 20 TO 50% | 50% | MAXIMUM DENSITY: 2<br>MAXIMUM DENSITY: 2 TO 3<br>MAXIMUM DENSITY: 3 TO 5<br>MAXIMUM DENSITY: 5 OR HIGHER | 0%<br>30%<br>50%<br>80% | 95%<br>97%<br>98%<br>99% |
| | | | 50% OR HIGHER | 80% | MAXIMUM DENSITY: 2<br>MAXIMUM DENSITY: 2 TO 3<br>MAXIMUM DENSITY: 3 TO 5<br>MAXIMUM DENSITY: 5 OR HIGHER | 0%<br>30%<br>50%<br>80% | 98%<br>99%<br>99%<br>100% |

FIG.5

| GRAPH TYPE | TRANSPARENCY ACCORDING TO GRAPH PROPERTY (FIRST TRANSPARENCY) | | TRANSPARENCY ACCORDING TO RATIO RELATIVE TO MAXIMUM DRAWING AREA (SECOND TRANSPARENCY) | | TRANSPARENCY ACCORDING TO DENSITY OF ELEMENTS IN PREDETERMINED AREA (THIRD TRANSPARENCY) | | FINAL TRANS-PARENCY |
|---|---|---|---|---|---|---|---|
| HEAT MAP | $X_{85}<x<X_{97.5}$ | 50% | LOWER THAN 5% | 0% | MAXIMUM DENSITY: 2<br>MAXIMUM DENSITY: 2 TO 3<br>MAXIMUM DENSITY: 3 TO 5<br>MAXIMUM DENSITY: 5 OR HIGHER | 0%<br>30%<br>50%<br>80% | 50%<br>65%<br>75%<br>90% |
| | | | 5 TO 20% | 20% | MAXIMUM DENSITY: 2<br>MAXIMUM DENSITY: 2 TO 3<br>MAXIMUM DENSITY: 3 TO 5<br>MAXIMUM DENSITY: 5 OR HIGHER | 0%<br>30%<br>50%<br>80% | 60%<br>72%<br>80%<br>92% |
| | | | 20 TO 50% | 50% | MAXIMUM DENSITY: 2<br>MAXIMUM DENSITY: 2 TO 3<br>MAXIMUM DENSITY: 3 TO 5<br>MAXIMUM DENSITY: 5 OR HIGHER | 0%<br>30%<br>50%<br>80% | 75%<br>83%<br>88%<br>95% |
| | | | 50% OR HIGHER | 80% | MAXIMUM DENSITY: 2<br>MAXIMUM DENSITY: 2 TO 3<br>MAXIMUM DENSITY: 3 TO 5<br>MAXIMUM DENSITY: 5 OR HIGHER | 0%<br>30%<br>50%<br>80% | 90%<br>93%<br>95%<br>98% |
| | $x>X_{97.5}$ | 0% | LOWER THAN 5% | 0% | MAXIMUM DENSITY: 2<br>MAXIMUM DENSITY: 2 TO 3<br>MAXIMUM DENSITY: 3 TO 5<br>MAXIMUM DENSITY: 5 OR HIGHER | 0%<br>30%<br>50%<br>80% | 0%<br>30%<br>50%<br>80% |
| | | | 5 TO 20% | 20% | MAXIMUM DENSITY: 2<br>MAXIMUM DENSITY: 2 TO 3<br>MAXIMUM DENSITY: 3 TO 5<br>MAXIMUM DENSITY: 5 OR HIGHER | 0%<br>30%<br>50%<br>80% | 20%<br>44%<br>60%<br>84% |
| | | | 20 TO 50% | 50% | MAXIMUM DENSITY: 2<br>MAXIMUM DENSITY: 2 TO 3<br>MAXIMUM DENSITY: 3 TO 5<br>MAXIMUM DENSITY: 5 OR HIGHER | 0%<br>30%<br>50%<br>80% | 50%<br>65%<br>75%<br>90% |
| | | | 50% OR HIGHER | 80% | MAXIMUM DENSITY: 2<br>MAXIMUM DENSITY: 2 TO 3<br>MAXIMUM DENSITY: 3 TO 5<br>MAXIMUM DENSITY: 5 OR HIGHER | 0%<br>30%<br>50%<br>80% | 80%<br>86%<br>90%<br>96% |
| ... | ... | ... | ... | ... | ... | ... | ... |

DISPLAY CONTROL SYSTEM, AND DISPLAY CONTROL METHOD FOR VISUAL PRESENTATION DATA

CROSS-REFERENCE TO RELATED APPLICATION

This application is based upon and claims the benefit of priority of the prior Japanese Patent Application No. 2015-009738, filed on Jan. 21, 2015, the entire contents of which are incorporated herein by reference.

FIELD

The embodiment discussed herein is related to a display control system, a display control method, and a computer-readable recording medium.

BACKGROUND

Pieces of data associated with business activities are accumulated and utilized. For example, pieces of data, such as operation logs, on manufacturing apparatuses on assembly lines for products are accumulated and utilized to improve production processes. Further, it is proposed to analyze pieces of information on a plurality of parameters acquired in a predetermined area, and to visualize and display an analysis result by three-dimensional space graphics.

[Patent Literature 1] Japanese Laid-open Patent Publication No. 2010-250769

However, in the three-dimensional space graphics, to visualize an area with a higher specificity among areas on the far side from a user's viewpoint, the area with the higher specificity is provided with a lower transparency. Therefore, if areas with higher specificities are located on the near side and the far side from the user's viewpoint, both of the areas are non-transparent, so that the area on the far side from the user's viewpoint is hidden and the visibility may be reduced; consequently, for example, information indicating abnormality of a manufacturing apparatus may be overlooked.

SUMMARY

According to an aspect of an embodiment, a display control system includes: at least a display control device including a transparency control unit that, when displaying a first display component and a second display component such that at least parts of the first display component and the second display component overlap each other, increases a transparency of at least one of the first display component and the second display component in an overlapping portion according to one of a density of display contents contained in the first display component and a density of display contents contained in the second display component in the overlapping portion.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating an example of a log storage unit;

FIG. 3 is a diagram illustrating an example of a transparency storage unit;

FIG. 4 is a diagram illustrating an example of the transparency storage unit;

FIG. 5 is a diagram illustrating an example of the transparency storage unit;

DESCRIPTION OF EMBODIMENT

Preferred embodiments of the present invention will be explained with reference to accompanying drawings. The embodiments are not intended to limit the disclosed technology. The embodiments below may be optionally combined without causing any inconsistency.

Figure 1:
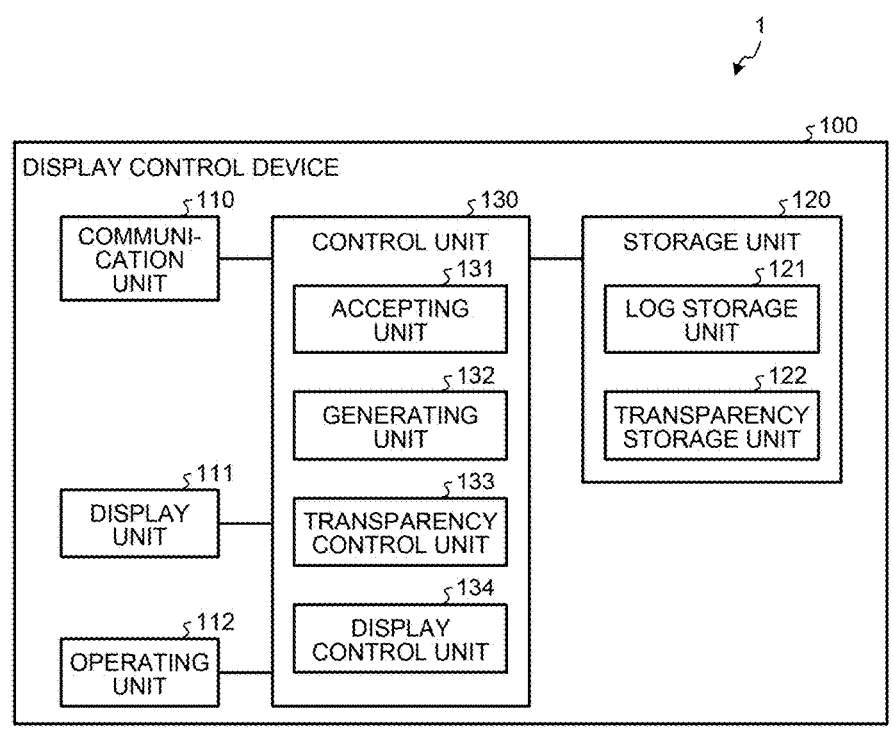
FIG. 1 is a block diagram illustrating an example of a configuration of a display control system according to an embodiment.

FIG. 1 is a block diagram illustrating an example of a configuration of a display control system according to an embodiment. A display control system 1 illustrated in FIG. 1 includes a display control device 100. The display control system 1 may include, for example, a control device for a machine tool, various test equipments for a temperature test, etc., and the like, in addition to the display control device 100. The display control device 100 can acquire log data from various devices. Furthermore, the display control system 1 may include a terminal device for an administrator. The display control device 100 and the various devices are communicably connected to each other via a network (not illustrated). Incidentally, in the following description, a case will be described, as an example, in which various types of information on an assembly line for a product are acquired as log data.

The display control device 100 of the display control system 1 illustrated in FIG. 1 generates a graph in which pieces of log data acquired from various devices are displayed in an overlapping manner, and provides the graph to an administrator of the assembly line for the product, for example. The display control device 100 displays a plurality of types of log data as objects, that is, display components, in an overlapping manner. The display control device 100 may display a first display component and a second display component such that at least parts of the display components overlap each other. In this case, the display control device 100 increases a transparency in an overlapping portion according to a density of display contents contained in the first display component or a density of display contents contained in the second display component in the overlapping portion. Incidentally, the display contents are pieces of data plotted on the graph, and are, for example, pieces of log data, such as pieces of quantitative data on temperature, humidity, and the like or pieces of event data on an error message and the like. Furthermore, as for the transparency in the overlapping portion, the transparency of at least one of the first display component and the second display component is increased. Therefor, the display control device 100 can display a plurality of types of overlapping objects, that is, pieces of data on the respective display components, in a visible manner.

Next, the configuration of the display control device 100 will be described. As illustrated in FIG. 1, the display control device 100 includes a communication unit 110, a display unit 111, an operating unit 112, a storage unit 120, and a control unit 130. The display control device 100 may include various functional units included in a well-known computer, for example, various functional units such as various input devices and voice output devices, in addition to the functional units illustrated in FIG. 1.

The communication unit 110 is implemented by, for example, a network interface card (NIC) or the like. The communication unit 110 is a communication interface that is connected to various devices via a network (not illustrated) by wire or wireless and controls communication of information with the various devices. The communication unit 110 receives log data from the various devices. The communication unit 110 outputs the received log data to the control unit 130.

The display unit 111 is a display device that displays various types of information. The display unit 111 is implemented by, for example, a liquid crystal display or the like as the display device. The display unit 111 displays various screens, such as a graph screen, input by the control unit 130.

The operating unit 112 is an input device that accepts various operations from an administrator. The operating unit 112 is implemented by, for example, a keyboard, a mouse, or the like as the input device. The operating unit 112 outputs, as operation information, operations input by the administrator to the control unit 130. The operating unit 112 may be implemented by a touch panel or the like as the input device, and the display device of the display unit 111 and the input device of the operating unit 112 may be integrated with each other.

The storage unit 120 is implemented by, for example, a semiconductor memory element, such as a random access memory (RAM) or a flash memory, or a storage device, such as a hard disk or an optical disk. The storage unit 120 includes a log storage unit 121 and a transparency storage unit 122. Furthermore, the storage unit 120 stores therein information used for a process performed by the control unit 130.

The log storage unit 121 stores therein log data received from various devices. FIG. 2 is a diagram illustrating an example of the log storage unit. As illustrated in FIG. 2, the log storage unit 121 stores therein items of "log ID", "date/time", "type", "process state", "temperature", and "event content". The log storage unit 121 stores therein one record for each element of log data, for example.

The "log ID" identifies each element of log data. The "date/time" indicates a date and time at which each element of the log data is acquired. The "type" indicates a type of the log data. Examples of the type include "traceability" indicating start or end of a process, a "temperature" indicating a temperature of a predetermined place on an assembly line, and "event" indicating occurrence of an error or the like. The "process state" indicates start or end of each process when the type is traceability. The "temperature" indicates a temperature when the type is temperature. The "event content" indicates a content of an event when the type is an event. Examples of the event content include "Emergency", "Error", and "Information". The "Emergency" is issued when, for example, a failure has occurred and operations have stopped in a manufacturing apparatus. The "Error" is issued when, for example, a component of a product manufactured by a manufacturing apparatus is not supplied and assembly is not possible. The "Information" is issued when, for example, the amount of components of a product manufactured by the manufacturing apparatus is reduced to below a predetermined amount.

Referring back to FIG. 1, the transparency storage unit 122 stores therein a final transparency based on various conditions, such as a graph type, property, a size relative to a drawing area, and a density of elements of a graph, in association with each of the conditions. FIG. 3 to FIG. 5 are diagrams illustrating examples of the transparency storage unit. As illustrated in FIG. 3 to FIG. 5, the transparency storage unit 122 stores therein items of "graph type", "transparency according to graph property", "transparency according to ratio relative to maximum drawing area", "transparency according to density of elements in predetermined area", and "final transparency".

The "graph type" indicates a type of a graph to be displayed. For example, the graph type is set to "trace" for traceability data, "heat map" for quantitative data, and "event" for event data. The "transparency according to graph property" indicates a transparency according to the property of a graph for each graph type. In the following descriptions, the transparency according to the graph property is referred to as a first transparency. As for the first transparency, for example, when the graph type is trace, the transparency is set to 0% if a single element is present at a certain time, and set to 50% if two or more elements overlap each other.

Furthermore, as for the first transparency, for example, when the graph type is a heat map and if values at a higher rank and a lower rank in a normal distribution are to be viewed, the transparency is set by using a percentile value. In this case, for example, the transparency is set to 0% when $x<X_{2.5}$, the transparency is set to 50% when $X_{2.5}<x<X_{15}$, the transparency is set to 90% when $X_{15}<x<X_{85}$, the transparency is set to 50% when $X_{85}<x<X_{97.5}$, and the transparency is set to 0% when $x>X_{97.5}$. Incidentally, x indicates a temperature, for example. Furthermore, as for the first transparency, for example, when the graph type is an event, the transparency is set to 20% for "Emergency", the transparency is set to 50% for "Error", and the transparency is set to 90% for "Information".

The "transparency according to ratio relative to maximum drawing area" indicates a transparency according to a ratio of an element of data in a graph to a maximum drawing area for a drawing area in which the element is drawn. In the following descriptions, the transparency according to the ratio relative to the maximum drawing area is referred to as a second transparency. As for the second transparency, for example, the transparency is set to 0% when the ratio is lower than 5%, the transparency is set to 20% when the ratio is equal to or higher than 5% and lower than 20%, the transparency is set to 50% when the ratio is equal to or higher than 20% and lower than 50%, and the transparency is set to 80% when the ratio is equal to or higher than 50%. When the graph type is a heat map, the second transparency is set according to a ratio of a width of the heat map, for example. Meanwhile, the ratio of the width of the heat map is, for example, a ratio of the width of the heat map to a width of the entire graph (display area) or a width of a single divided area among divided areas that are obtained by dividing the graph into a plurality of areas. Incidentally, the width of the entire graph or the width of the single divided area among the divided areas obtained by dividing the graph into a plurality of areas is a maximum drawing area in which data of the heat map is drawn.

For example, when the graph type is an event, the second transparency indicates a transparency according to a ratio of the diameter of a point with the maximum diameter among displayed points (elements of data) to the length of the time axis of the graph. Incidentally, the length of the time axis of the graph may be the length of the time axis of a graph displayed in a display area that can be displayed at once, or may be the length of the time axis of a single divided area among divided areas that are obtained by dividing a display area into a plurality of areas. In other words, the length of the time axis of the graph is a maximum drawing area in which data of the event graph can be drawn.

For example, as for a point of the event graph, the diameter is set to 20 pixels for "Emergency", the diameter is set to 10 pixels for "Error", and the diameter is set to 4 pixels for "Information". In this case, for example, if the vertical pixels of a display area are 200 pixels and a point corresponding to "Emergency" is plotted in the display area, the ratio of the diameter of the point with the maximum diameter to the length of the time axis of the display area is 20/200=10%. Therefore, the second transparency is set to 20%.

The "transparency according to density of elements in predetermined area" indicates, for example, a transparency according to the maximum density in a plurality of predetermined areas among densities that are calculated for the respective predetermined areas by multiplication of the numbers of elements of data of a heat map, an event graph, or the like in the predetermined areas with coefficients. Incidentally, as for the predetermined area, for example, a single divided area among divided areas that are obtained by dividing a display area into a plurality of areas may be used. In the following descriptions, the transparency according to the density of elements in the predetermined area is referred to as a third transparency. As for the third transparency, for example, the transparency is set to 0% when the maximum density is lower than 2, the transparency is set to 30% when the maximum density is equal to or higher than 2 and lower than 3, the transparency is set to 50% when the maximum density is equal to or higher than 3 and lower than 5, and the transparency is set to 80% when the maximum density is equal to or higher than 5.

The "final transparency" indicates a transparency applied to each graph in a display area in a graph screen displayed on the display unit 111. The final transparency is calculated based on the first transparency, the second transparency, and the third transparency.

Referring back to FIG. 1, the control unit 130 is implemented by, for example, executing a program stored in an internal storage device by a central processing unit (CPU) or a micro processing unit (MPU) by using a RAM as a work area. Furthermore, the control unit 130 may be implemented by an integrated circuit, such as an application specific integrated circuit (ASIC) or a field programmable gate array (FPGA). The control unit 130 includes an accepting unit 131, a generating unit 132, a transparency control unit 133, and a display control unit 134, and implements or executes functions and operations of information processing as described below. Incidentally, the internal configuration of the control unit 130 is not limited to the configuration illustrated in FIG. 1, and other configurations that perform the information processing as described below may be applied.

The accepting unit 131, when operation information indicating display of a graph is input from the operating unit 112, accepts display of the graph. The accepting unit 131, upon accepting the display of the graph, acquires log data from various devices via the communication unit 110. The accepting unit 131 stores the acquired log data in the log storage unit 121. The accepting unit 131, upon completion of storage of the acquired log data, outputs generation information to the generating unit 132. Meanwhile, the accepting unit 131 may continue to store log data obtained from various devices in real time. In this case, the accepting unit 131 outputs the generation information to the generating unit 132 when all pieces of data to be displayed in a display area are stored in the log storage unit 121.

The generating unit 132, upon input of the generation information from the accepting unit 131, refers to the log storage unit 121 and generates a graph to be displayed on a graph screen, that is, a graph to be displayed in a display area of the graph screen. Specifically, the generating unit 132 performs a process of generating each graph in a first transparent process including the process of generating each graph and a process of generating the first transparency. The generating unit 132 acquires data of each element from the log storage unit 121 for each data type for which the graph is to be generated. The generating unit 132 determines whether the acquired data is traceability data. If the acquired data is traceability data, the generating unit 132 generates a trace graph in which data bands connecting start times and connecting end times of respective processes are expressed. If the acquired data is not traceability data, the generating unit 132 determines whether the acquired data is quantitative data.

If the acquired data is quantitative data, the generating unit 132 generates a heat map in which each process is expressed as a band parallel to the time axis. If the acquired data is not quantitative data, the generating unit 132 determines that the acquired data is event data, and generates an event graph in which an event that has occurred on the time axis is expressed as a circular point for each process. Meanwhile, the generating unit 132 may generate other graphs, such as a line graph or a bar graph, according to the type of log data. The generating unit 132 outputs, as graph data, the trace graph, the heat map, and the event graph generated as described above to the transparency control unit 133.

Figure 6:
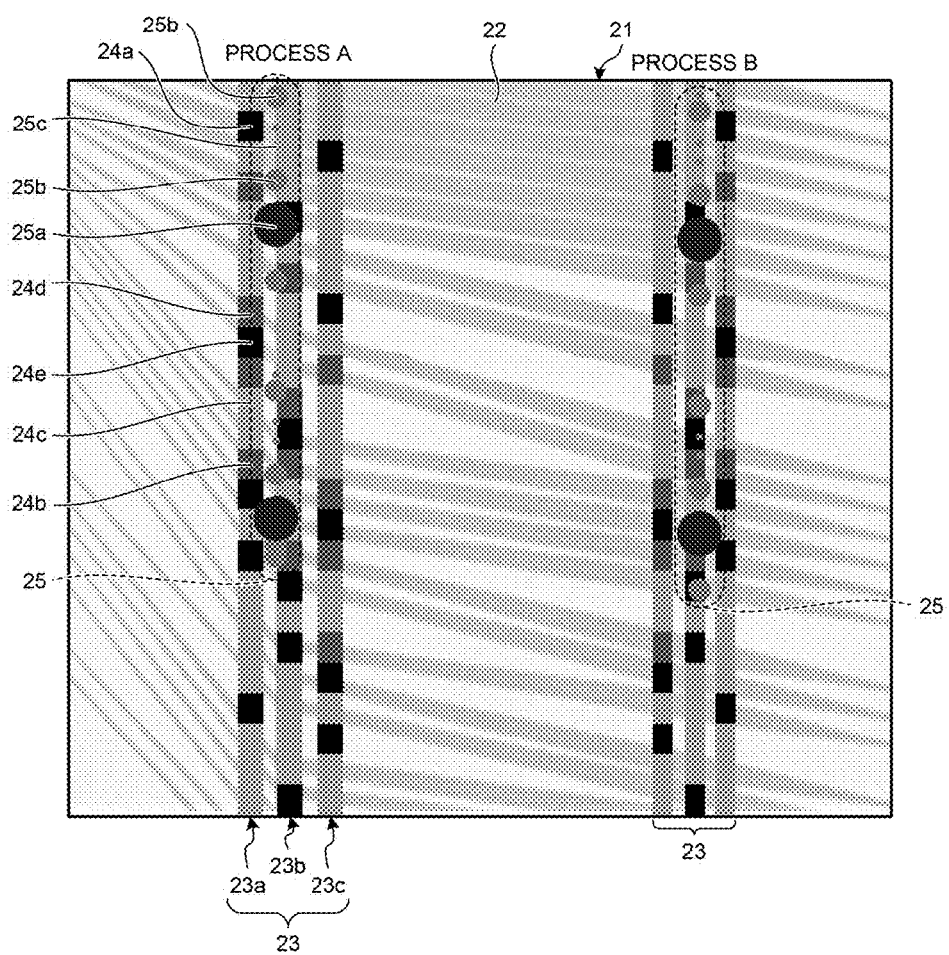
FIG. 6 is a diagram illustrating an example of a graph in which transparencies are not set.

A graph generated by the generating unit 132 will be described below with reference to FIG. 6. FIG. 6 is a diagram illustrating an example of a graph in which transparencies are not set. A graph 21 illustrated in FIG. 6 is a graph in which a trace graph, a heat map, and an event graph generated by the generating unit 132 are displayed in an overlapping manner. In the graph 21, data bands 22 as elements of the trace graph are displayed on the backmost side. Furthermore, in the graph 21, bands 23 as elements of the heat map are displayed on the trace graph in an overlapping manner. Moreover, in the graph 21, points 25 as elements of the event graph are displayed on the heat map in an overlapping manner. Incidentally, the trace graph, the heat map, and the event graph are objects, and the data bands 22, the bands 23, and the points 25 are display contents. In the graph 21, the data bands 22, the bands 23, and the points 25 displayed in an overlapping manner are not transparent. Therefore, the data bands 22 are hidden by the bands 23 and the points 25 and are invisible in portions where the bands 23 and the points 25 are arranged. Furthermore, the bands 23 are hidden by the points 25 and are invisible in portions where the points 25 are arranged.

In the example in FIG. 6, in the graph 21, the data bands 22 connecting start times and connecting end times between a process A and a process B and in intervals from previous and next processes (not illustrated) are displayed. Furthermore, in the graph 21, bands 23a, 23b, and 23c of the heat map are displayed along the time axis of the process A. The heat map will be explained below by taking the band 23a as an example. The band 23a can be displayed by using a percentile value of a normal distribution of a temperature, for example. In FIG. 6, as to the temperature x for example, $x<X_{2.5}$ is represented as a band area 24a, $X_{2.5}<x<X_{15}$ is represented by a band area 24b, $X_{15}<x<X_{85}$ is represented by a band area 24c, $X_{85}<x<X_{97.5}$ is represented by a band area 24d, and $x>X_{97.5}$ is represented by a band area 24e in order from a higher temperature side in a predetermined temperature range.

Furthermore, in the graph 21, a point 25a as a point corresponding to "Emergency" and a point 25b as a point corresponding to "Error" are displayed along the time axis of the process A. Moreover, in the graph 21, a point 25c as a point corresponding to "Information" is displayed along the time axis of the process A. Meanwhile, in the graph 21, the bands 23 and the points 25 are displayed in the same manner for the process B.

Referring back to FIG. 1, the transparency control unit 133, upon input of the graph data from the generating unit 132, refers to the transparency storage unit 122 and generates the first transparency, the second transparency, and the third transparency. Furthermore, the transparency control unit 133 calculates a final transparency based on the first transparency, the second transparency, and the third transparency generated as described above.

First, a process of generating the first transparency in the first transparent process will be described. If the graph data is a trace graph, the transparency control unit 133 determines whether processes as parallel processes are included and data bands overlap each other. If processes as parallel processes are included and data bands overlap each other, the transparency control unit 133 generates the first transparency such that the transparencies of the data bands are set to 50%. If processes as parallel processes are not included or data bands do not overlap each other, the transparency control unit 133 generates the first transparency such that the transparencies of the data bands are set to 0%.

If the graph data is a heat map, the transparency control unit 133 refers to the transparency storage unit 122 and generates the first transparency such that the transparency is set according to a distribution of data. In the examples in FIG. 3 to FIG. 6, the transparency control unit 133 generates the first transparency such that the transparency is set to 0% for the band area 24a, the transparency is set to 50% for the band area 24b, the transparency is set to 90% for the band area 24c, the transparency is set to 50% for the band area 24d, and the transparency is set to 0% for the band area 24e.

If the graph data is an event graph, the transparency control unit 133 refers to the transparency storage unit 122 and generates the first transparency such that the transparency is set according to an event type. In the examples in FIG. 3 to FIG. 6, the transparency control unit 133 generates the first transparency such that the transparency is set to 20% for the point 25a, the transparency is set to 50% for the point 25b, and the transparency is set to 90% for the point 25c. The transparency control unit 133 determines whether generation of the graph and the first transparency is completed for all of the data types. If generation of the graph and the first transparency is not completed for all of the data types, the transparency control unit 133 selects a next data type and outputs an instruction to generate a graph to the generating unit 132. If generation of the graph and the first transparency is completed for all of the data types, the transparency control unit 133 proceeds to a process of generating the second transparency.

Figure 7:
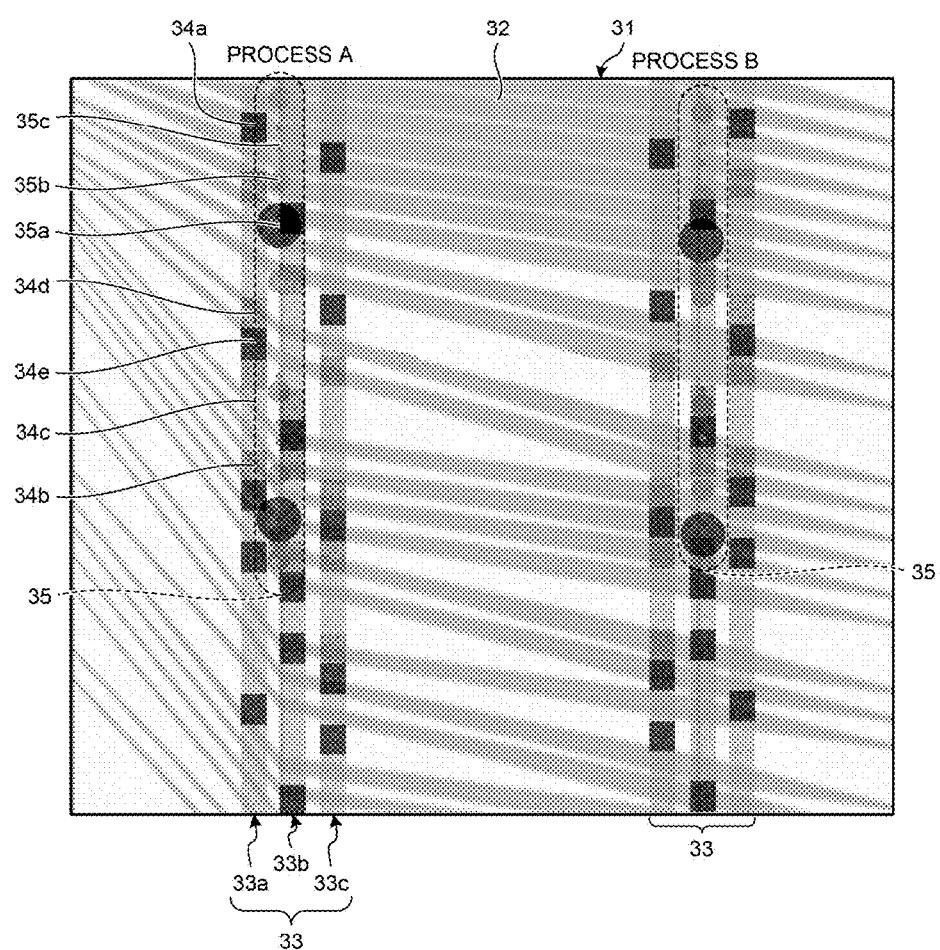
FIG. 7 is a diagram illustrating an example of a graph in which first transparencies are set.

A graph in which the first transparencies are set will be explained below with reference to FIG. 7. FIG. 7 is a diagram illustrating an example of a graph in which the first transparencies are set. A graph 31 illustrated in FIG. 7 is a graph indicating a state in which the first transparencies are set with respect to the graph 21 illustrated in FIG. 6. In the graph 31, data bands 32 as elements of the trace graph is displayed on the backmost side. Furthermore, in the graph 31, bands 33 as elements of the heat map are displayed on the trace graph in an overlapping manner. Moreover, in the graph 31, points 35 as elements of the event graph are displayed on the heat map in an overlapping manner.

In the example in FIG. 7, in the graph 31, the data bands 32 connecting start times and connecting end times between the process A and the process B and in intervals from previous and next processes (not illustrated) are displayed. As for the data bands 32, for example, the final transparencies are set to 0% because the data bands do not overlap each other. Furthermore, in the graph 31, bands 33a, 33b, and 33c of the heat map are displayed along the time axis of the process A. The heat map will be explained below by taking the band 33a as an example. In the band 33a, for example, the first transparency is set such that the transparency is set to 0% for a band area 34a, the transparency is set to 50% for a band area 34b, the transparency is set to 90% for a band area 34c, the transparency is set to 50% for a band area 34d, and the transparency is set to 0% for a band area 34e.

Furthermore, in the graph 31, a point 35a as a point corresponding to "Emergency" and a point 35b as a point corresponding to "Error" are displayed along the time axis of the process A. Moreover, in the graph 31, a point 35c as a point corresponding to "Information" is displayed along the time axis of the process A. As for the points 35, for example, transparency of 20% is set for the point 35a, the transparency is set to 50% for the point 35b, and the transparency is set to 90% for the point 35c. Meanwhile, in the graph 31, the bands 33 and the points 35 are displayed in the same manner for the process B, and respective first transparencies are set.

Next, a second transparent process of generating the second transparency will be described. The transparency control unit 133 determines whether a display order of a graph in which the first transparency is generated is the backmost side. If the display order of the graph is the backmost side, the transparency control unit 133 refers to the transparency storage unit 122 and generates the second transparency such that the setting of the transparency is not changed. Specifically, the transparency control unit 133 generates the second transparency such that the transparency is set to 0%. If the display order of the graph is not the backmost side, the transparency control unit 133 determines whether the graph is a heat map.

If the graph is a heat map, the transparency control unit 133 refers to the transparency storage unit 122 and generates the second transparency such that the transparency is set according to the ratio of the width of the heat map to the width of the entire graph or the width of the divided area. In the example in FIG. 4 and FIG. 5, the transparency control unit 133 generates the second transparency such that the transparency is set to 0% when the ratio of the width of the heat map to the width of the entire graph or the width of the divided area, that is, to the width of the maximum drawing area, is lower than 5%, and the transparency is set to 20% when the ratio is equal to or higher than 5% and lower than 20%. Furthermore, the transparency control unit 133 generates the second transparency such that the transparency is set to 50% when the ratio of the width of the heat map to the width of the maximum drawing area is equal to or higher than 20% and lower than 50%, and the transparency is set to 80% when the ratio is equal to or higher than 50%.

If the graph is not a heat map, the transparency control unit 133 determines whether the graph is an event graph. If the graph is an event graph, the transparency control unit 133 refers to the transparency storage unit 122 and generates the second transparency such that the transparency is set according to the ratio of the diameter of the point with the maximum diameter among points in the event graph to the length of the time axis of the graph. In the example in FIG. 3, the transparency control unit 133 generates the second transparency such that the transparency is set to 0% when the ratio of the diameter of the point with the maximum diameter to the length of the time axis of the graph is lower than 5%, and the transparency is set to 20% when the ratio is equal to or higher than 5% and lower than 20%. Furthermore, the transparency control unit 133 generates the second transparency such that the transparency is set to 50% when the ratio of the diameter of the point with the maximum diameter to the length of the time axis of the graph is equal to or higher than 20% and lower than 50%, and the transparency is set to 80% when the ratio is equal to or higher than 50%.

If the graph is not an event graph, the transparency control unit 133 refers to the transparency storage unit 122 and generates the second transparency such that the setting of the transparency is not changed. Specifically, the transparency control unit 133 generates the second transparency such that the transparency is set to 0%.

Next, a third transparent process of setting a coefficient for a density used to generate the third transparency will be described. The transparency control unit 133 determines whether a display order of a graph in which the second transparency is generated is the backmost side. If the display order of the graph is the backmost side, the transparency control unit 133 refers to the transparency storage unit 122 and generates the third transparency such that the setting of the transparency is not changed. Specifically, the transparency control unit 133 generates the third transparency such that the transparency is set to 0%. If the display order of the graph is not the backmost side, the transparency control unit 133 determines whether the graph is a heat map.

If the graph is a heat map, the transparency control unit 133 sets a coefficient for a density corresponding to the ratio of the width of the heat map to the width of the entire graph or the width of the divided area. If the graph is not a heat map, the transparency control unit 133 determines whether the graph is an event graph. If the graph is an event graph, the transparency control unit 133 sets a coefficient for a density for each of the divided areas on the basis of the number of points in the event graph and the ratio of the diameter of the point to the length of the time axis of the divided area. Incidentally, the divided area may be a display area employed as a single divided area.

If the graph is not an event graph, the transparency control unit 133 sets a predetermined coefficient for a density according to the graph type. The predetermined coefficient for the density according to the graph type may be set to "0.3" for a line graph or "0.5" for a bar graph, for example.

The transparency control unit 133 determines whether the second transparent process and the third transparent process are completed for all of the graph types. If the second transparent process and the third transparent process are not completed, the transparency control unit 133 selects a next graph and performs the second transparent process and the third transparent process. If the second transparent process and the third transparent process are completed, the transparency control unit 133 calculates the density for each of the divided areas on the basis of the coefficient for the density set in the third transparent process. The transparency control unit 133 refers to the transparency storage unit 122 and generates the third transparency such that the transparency is set according to the maximum density among the divided areas. In the example in FIG. 3, if the maximum density is "3", the transparency control unit 133 generates the third transparency such that the transparency is set to 50%.

The transparency control unit 133, upon completion of generation of the first to the third transparencies, calculates a final transparency for each graph based on the first to the third transparencies by using Expression (1) below.

$$\text{Final transparency}=1-(1-\text{first transparency})\times(1-\text{second transparency})\times(1-\text{third transparency}) \quad (1)$$

Incidentally, the transparency control unit 133 may refer to the transparency storage unit 122 based on the first to the third transparencies and acquire the final transparency corresponding to the graph type and the first to the third transparencies. The transparency control unit 133 generates output data by setting the calculated or acquired final transparency in each graph data, and outputs the output data to the display control unit 134. Incidentally, as for a graph whose display order is the backmost side, the transparency control unit 133 may employ the transparency of 0% without setting the transparency, for example.

Incidentally, the values of the transparencies illustrated in FIG. 3 to FIG. 5 are described as examples for explanation, and values other than these values may be used. Even when values other than the values in the figures are used, the final transparency is calculated by Expression (1) as described above. If the transparency is not set for all of the graphs, expression is realized by setting all of the transparencies to 0%.

Figure 8:
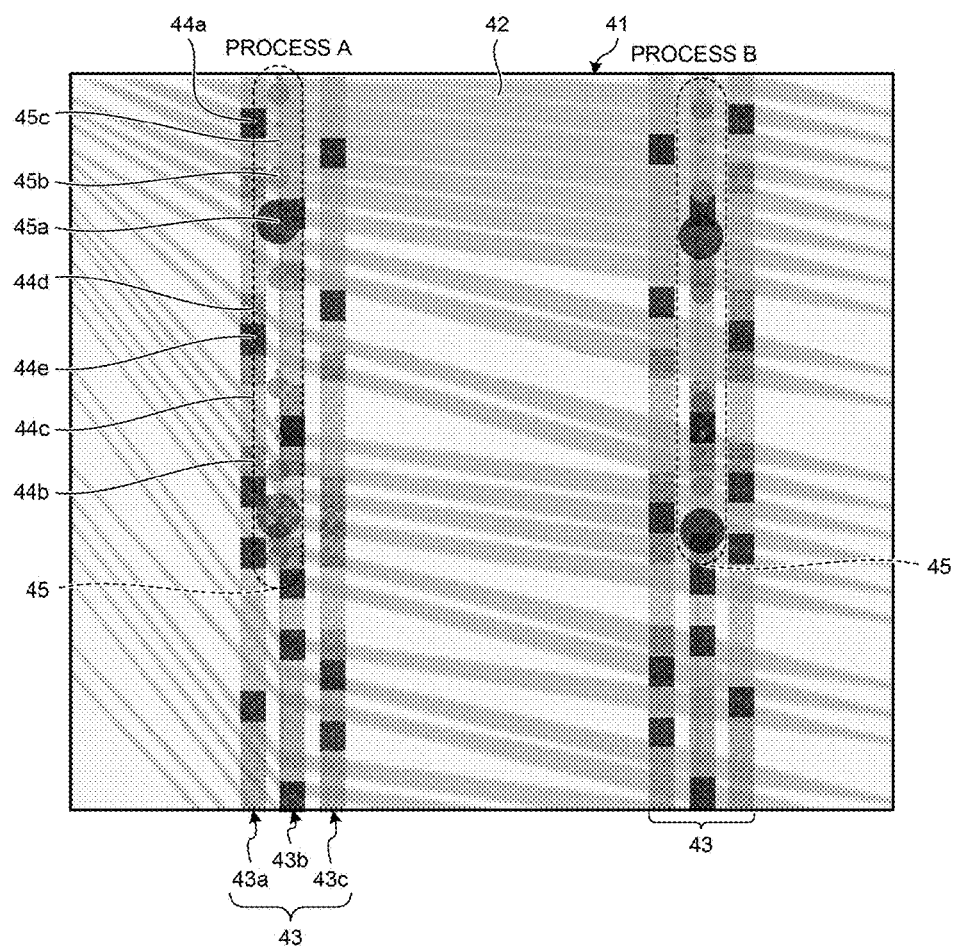
FIG. 8 is a diagram illustrating an example of a graph in which setting of transparencies is completed.
Figure 9:
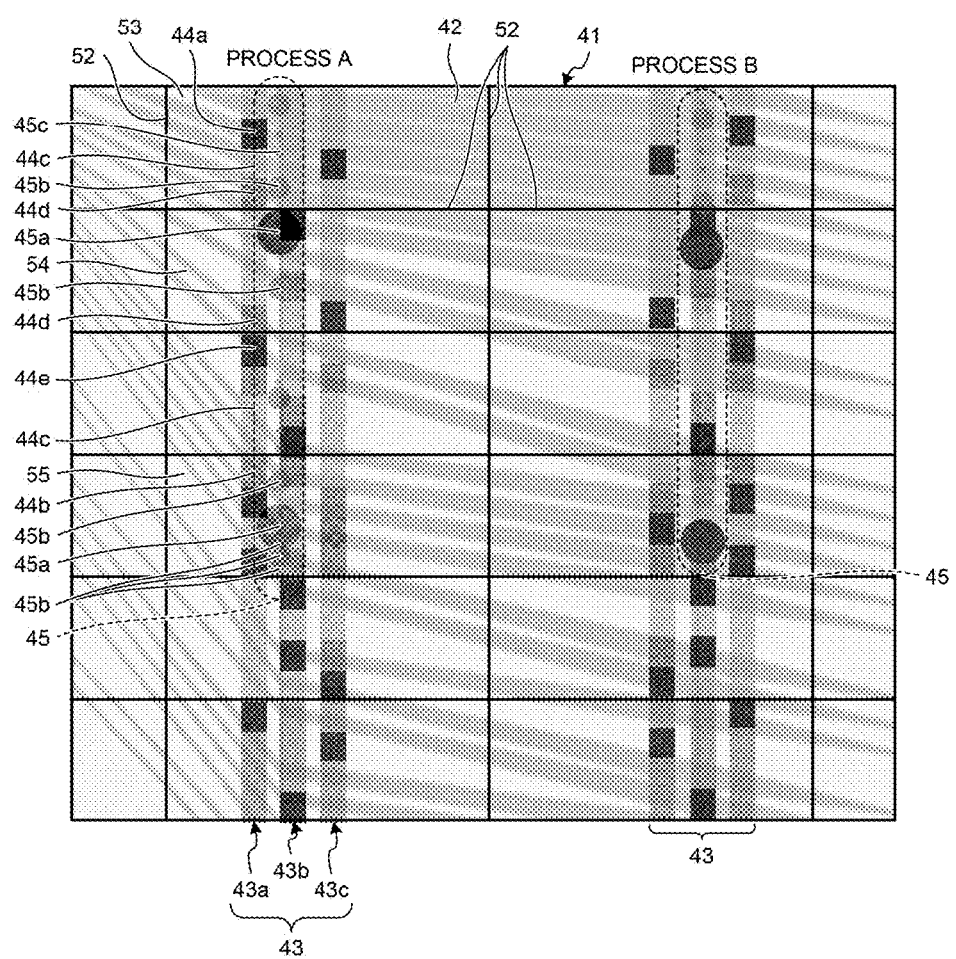
FIG. 9 is a diagram illustrating an example of a graph in which setting of transparencies is completed and which includes display of predetermined areas.

A graph in which setting of the transparencies is completed will be described below with reference to FIG. 8 and FIG. 9. FIG. 8 is a diagram illustrating an example of a graph in which setting of the transparencies is completed. FIG. 9 is a diagram illustrating an example of a graph in which setting of the transparencies is completed and which includes display of predetermined areas. A graph 41 illustrated in FIG. 8 and FIG. 9 is a graph indicating a state in which the final transparencies are set. Furthermore, FIG. 9 is a graph in which displays 52 of predetermined areas are displayed on the graph 41 in FIG. 8 in an overlapping manner. In the graph 41, data bands 42 as elements of a trace graph are displayed on the backmost side. Furthermore, in the graph 41, bands 43 as elements of a heat map are displayed on the trace graph in an overlapping manner. Moreover, in the graph 41, points 45 as elements of an event graph are displayed on the heat map in an overlapping manner. In the graph 41, the data bands 42 are visible in a transparent manner even when the bands 43 and the points 45 are arranged on the data bands 42. Furthermore, in the graph 41, the bands 43 are visible in a transparent manner even when the points 45 are arranged on the bands 43. Moreover, in the graph 41, the data bands 42 and the bands 43 are visible in a transparent manner even when the bands 43 and the points 45 are arranged on the data bands 42.

In the example in FIG. 9, in the graph 41, the data bands 42 connecting start times and connecting end times between the process A and the process B and in intervals from previous and next processes (not illustrated) are displayed. As for the data bands 42, for example, the final transparencies are set to 0%. Furthermore, in the graph 41, bands 43a, 43b, and 43c of the heat map are displayed along the time axis of the process A. A band area 44a contained in a divided area 53 will be described below as an example. It is assumed that the ratio of the bands 43a, 43b, and 43c contained in the divided area 53 to the divided area 53 is 30%. Furthermore, for example, it is assumed that the density of the divided area 53 is 2.6 and the maximum density is 3.5. In this case, the first to the third transparencies are set to 0%, 50%, and 50%, respectively, and the final transparency of the band area 44a is set to 75%. Similarly, in the divided area 53 of the graph 41, the final transparency of a band area 44c is set to 98%, the final transparency of a band area 44d is set to 88%, and the final transparency of a band area 44e is set to 75%. Meanwhile, if a band area 44b is contained in the divided area 53 of the graph 41, the final transparency of the band area 44b is set to 88%.

Moreover, in the graph 41, a point 45a as a point corresponding to "Emergency" and a point 45b as a point corresponding to "Error" are displayed along the time axis of the process A. Furthermore, in the graph 41, a point 45c as a point corresponding to "Information" is displayed along the time axis of the process A.

An example of calculations of the final transparency of a point in the event graph will be described below. In a divided area 54, if it is assumed that the number of points in the divided area 54 is two and the ratio of the diameter of the point to the length of the time axis of the divided area is 0.15, a coefficient for the density of the event graph is 2×0.15=0.3. If it is assumed that the coefficient for the trace graph is 1 and the coefficient for the heat map is 1, the density of the divided area 54 is 0.3+1+1=2.3. Furthermore, it is assumed that the maximum density is 3.5. In this case, the first to the third transparencies of the point 45a in the divided area 54 are set to 20%, 20%, and 50%, respectively, and the final transparency is set to 68%. Similarly, the final transparency of the point 45b in the divided area 54 is set to 80%.

Moreover, in a divided area 55, if it is assumed that the number of points in the divided area 55 is five and the ratio of the diameter of the point to the length of the time axis of the divided area is 0.3, a coefficient for the density of the event graph is 5×0.3=1.5. If it is assumed that the coefficient for the trace graph is 1 and the coefficient for the heat map is 1, the density of the divided area 55 is 1.5+1+1=3.5. Furthermore, it is assumed that the maximum density is 3.5. In this case, the first to the third transparencies of the point 45a in the divided area 55 are set to 20%, 50%, and 50%, respectively, and the final transparency is set to 80%. Similarly, the final transparency of the point 45b in the divided area 54 is set to 88%.

If the divided area 54 and the divided area 55 are compared, the transparency of the point 45a in the divided area 54 is 68%, and the transparency of the point 45a in the divided area 55 is 80%. Furthermore, the transparency of the point 45b in the divided area 54 is 80%, and the transparency of the point 45b in the divided area 55 is 88%. That is, the display control device 100 changes the transparency even for, for example, the point 45a indicating the same "Emergency" according to the density of data in an area in which the point is arranged. Meanwhile, the display control device 100 changes the transparency for the bands 43 in the same manner according to the density of data in an area in which the heat map is arranged. In this manner, the display control device 100 increases the transparency of a graph with an increase in the density of data contained in a plurality of types of overlapping graphs, so that it is possible to display the plurality of types of overlapping graphs in a visible manner.

Referring back to FIG. 1, the display control unit 134, upon input of the output data from the transparency control unit 133, generates a graph screen based on the input output data. Specifically, the display control unit 134, by using a graph generated based on the output data, generates a graph screen to be displayed in a display area of the graph. The display control unit 134 outputs and displays the generated graph screen onto the display unit 111.

Figure 10:
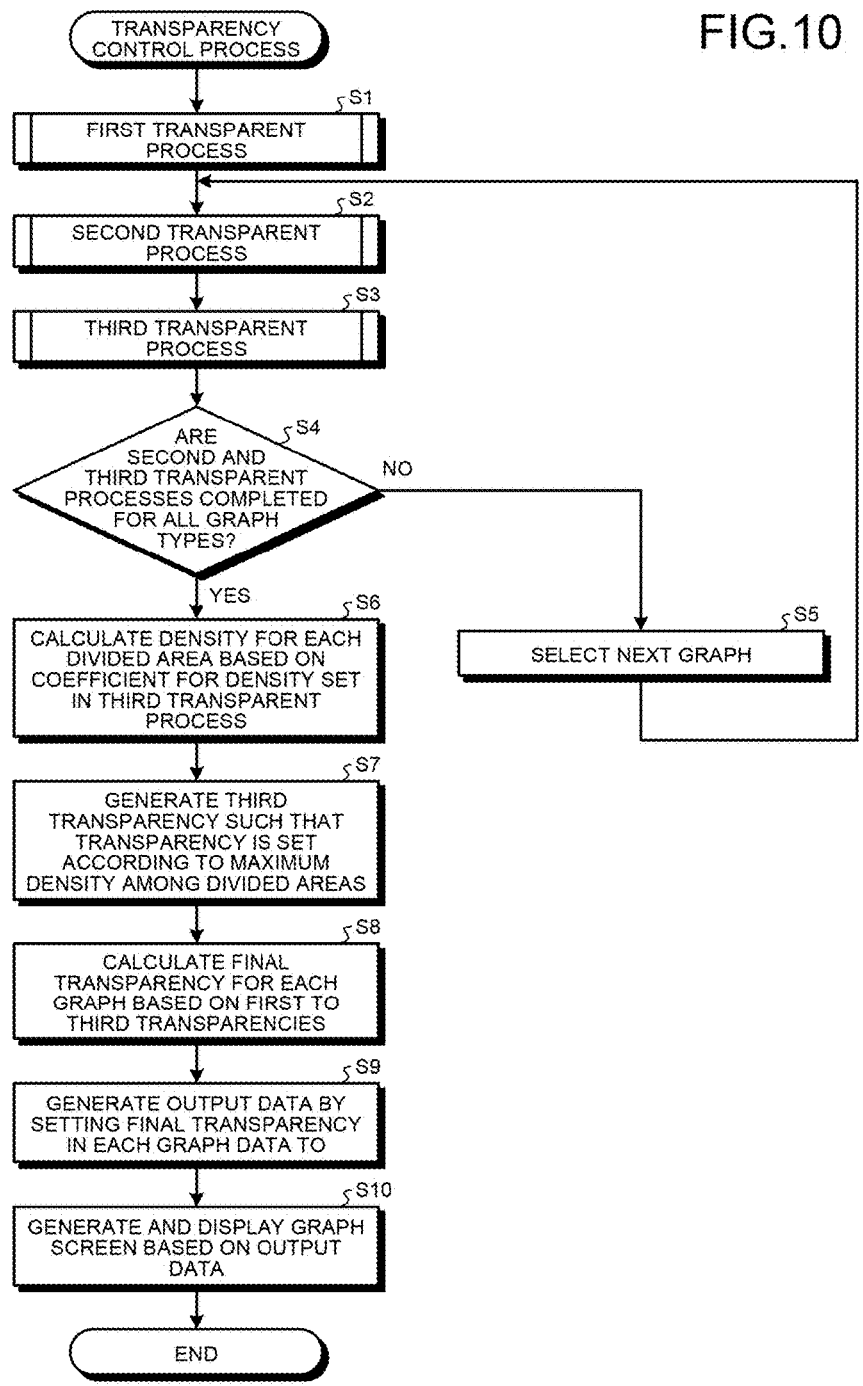
FIG. 10 is a flowchart illustrating an example of a transparency control process according to the embodiment.

Next, operations of the display control system 1 according to the embodiment will be described. FIG. 10 is a flowchart illustrating an example of a transparency control process according to the embodiment. The accepting unit 131 of the display control device 100, when operation information indicating display of a graph is input from the operating unit 112, accepts display of the graph. The accepting unit 131, upon accepting the display of the graph, acquires log data from various devices via the communication unit 110. The accepting unit 131 stores the acquired log data in the log storage unit 121. The accepting unit 131, upon completion of storage of the acquired log data, outputs generation information to the generating unit 132. The generating unit 132, upon input of the generation information from the accepting unit 131, performs the first transparent process (Step S1).

Figure 11:
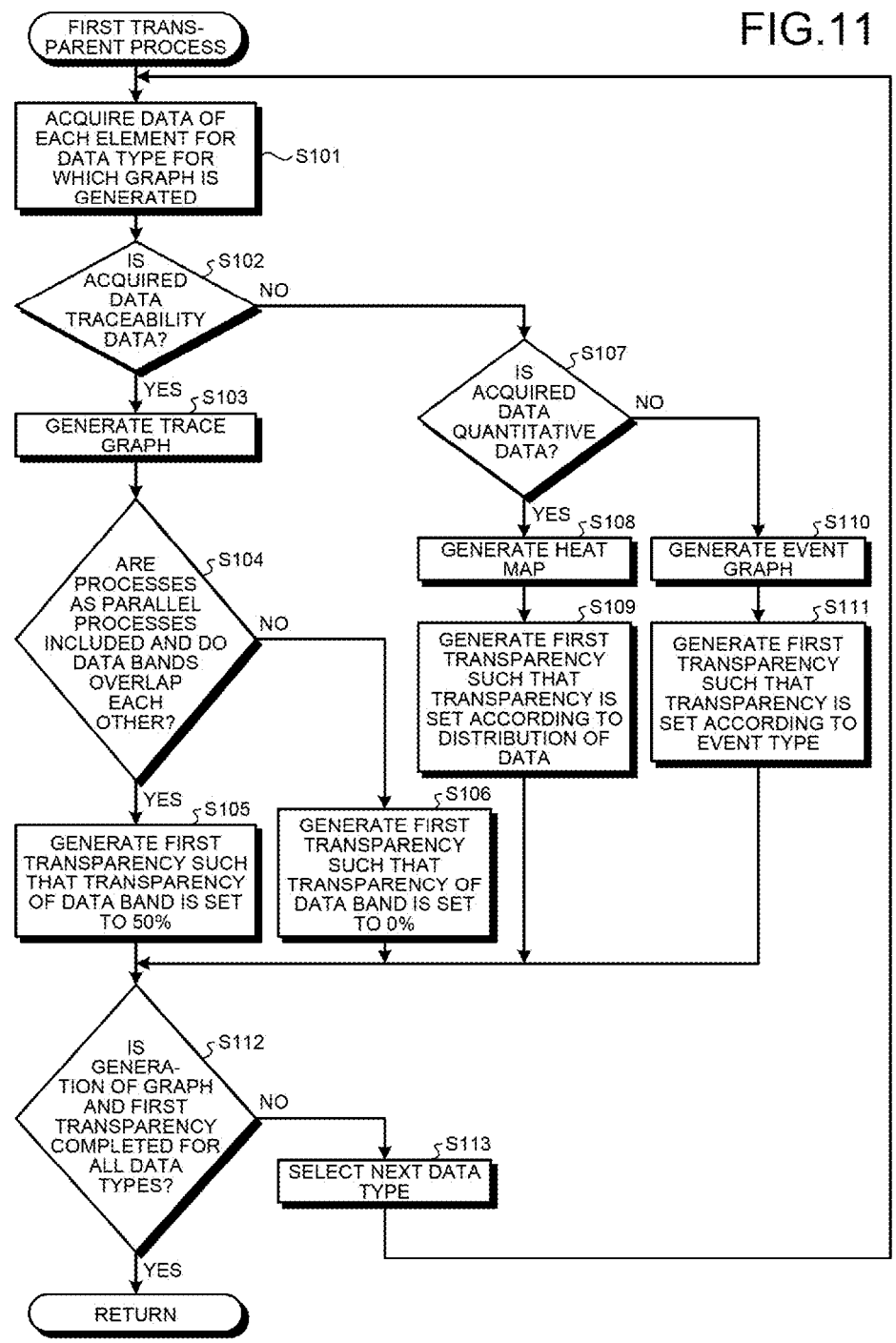
FIG. 11 is a flowchart illustrating an example of a first transparent process.

The first transparent process will be explained below with reference to FIG. 11. FIG. 11 is a flowchart illustrating an example of the first transparent process. The generating unit 132 acquires data of each element from the log storage unit 121 for a data type for which a graph is generated (Step S101). The generating unit 132 determines whether the acquired data is traceability data (Step S102). If the acquired data is traceability data (YES at Step S102), the generating unit 132 generates a trace graph in which data bands connecting start times and connecting end times of respective processes are expressed (Step S103). The generating unit 132 outputs the generated trace graph as graph data to the transparency control unit 133.

The transparency control unit 133, upon input of the trace graph as the graph data from the generating unit 132, determines whether processes as parallel processes are included and data bands overlap each other in the trace graph (Step S104). If processes as parallel processes are included and data bands overlap each other (YES at Step S104), the transparency control unit 133 generates the first transparency such that the transparencies of the data bands are set to 50% (Step S105). If processes as parallel processes are not included or data bands do not overlap each other (NO at Step S104), the transparency control unit 133 generates the first transparency such that the transparencies of the data bands are set to 0% (Step S106).

Referring back to Step S102, if the acquired data is not traceability data (NO at Step S102), the generating unit 132 determines whether the acquired data is quantitative data (Step S107). If the acquired data is quantitative data (YES at Step S107), the generating unit 132 generates a heat map (Step S108). The generating unit 132 outputs the generated heat map as graph data to the transparency control unit 133.

The transparency control unit 133, upon input of the heat map as the graph data from the generating unit 132, generates the first transparency such that the transparency is set according to a distribution of data (Step S109).

If the acquired data is not quantitative data (NO at Step S107), the generating unit 132 determines that the acquired data is event data and generates an event graph (Step S110). The generating unit 132 outputs the generated event graph as graph data to the transparency control unit 133. The transparency control unit 133, upon input of the event graph as the graph data from the generating unit 132, generates the first transparency such that the transparency is set according to an event type (Step S111).

The transparency control unit 133 determines whether generation of the graph and the first transparency is completed for all of the data types (Step S112). If generation of the graph and the first transparency is not completed for all of the data types (NO at Step S112), the transparency control unit 133 selects a next data type (Step S113), outputs an instruction to generate a graph to the generating unit 132, and returns the process to Step S101. If generation of the graph and the first transparency is completed for all of the data types (YES at Step S112), the transparency control unit 133 returns the process. Therefore, the display control device 100 can generate the first transparency.

Figure 12:
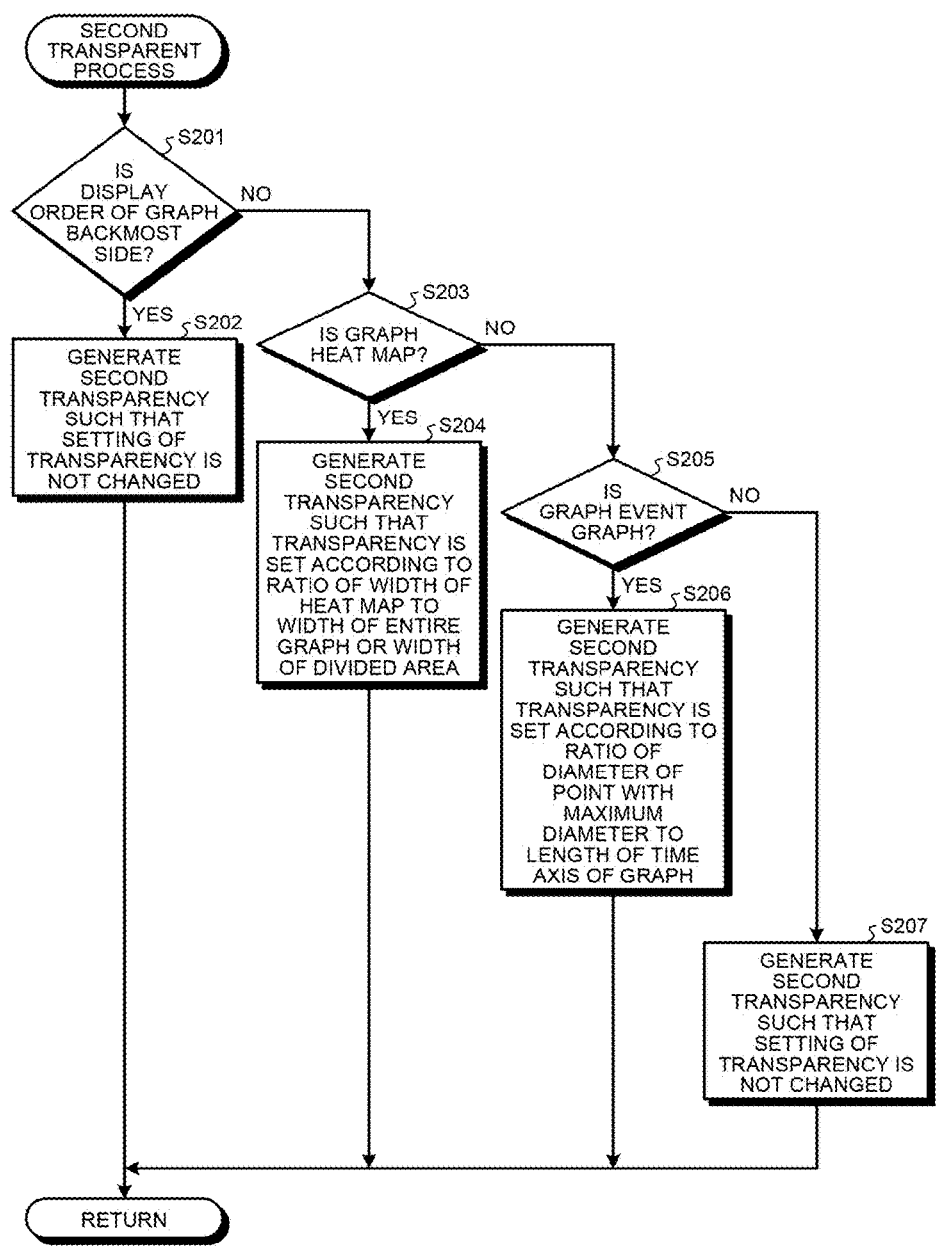
FIG. 12 is a flowchart illustrating an example of a second transparent process.

Referring back to FIG. 10, the transparency control unit 133 performs the second transparent process (Step S2). The second transparent process will be described below with reference to FIG. 12. FIG. 12 is a flowchart illustrating an example of the second transparent process. The transparency control unit 133 determines whether a display order of a graph in which the first transparency is generated is the backmost side (Step S201). If the display order of the graph is the backmost side (YES at Step S201), the transparency control unit 133 generates the second transparency such that the setting of the transparency is not changed (Step S202), and returns the process.

If the display order of the graph is not the backmost side (NO at Step S201), the transparency control unit 133 determines whether the graph is a heat map (Step S203). If the graph is a heat map (YES at Step S203), the transparency control unit 133 generates the second transparency such that the transparency is set according to the ratio of the width of the heat map to the width of the entire graph or the width of the divided area (Step S204), and returns the process.

If the graph is not a heat map (NO at Step S203), the transparency control unit 133 determines whether the graph is an event graph (Step S205). If the graph is an event graph (YES at Step S205), the transparency control unit 133 generates the second transparency such that the transparency is set according to the ratio of the diameter of the point with the maximum diameter among points in the event graph to the length of the time axis of the graph (Step S206), and returns the process. If the graph is not an event graph (NO at Step S205), the transparency control unit 133 generates the second transparency such that the setting of the transparency is not changed (Step S207), and returns the process. Therefore, the display control device 100 can generate the second transparency.

Figure 13:
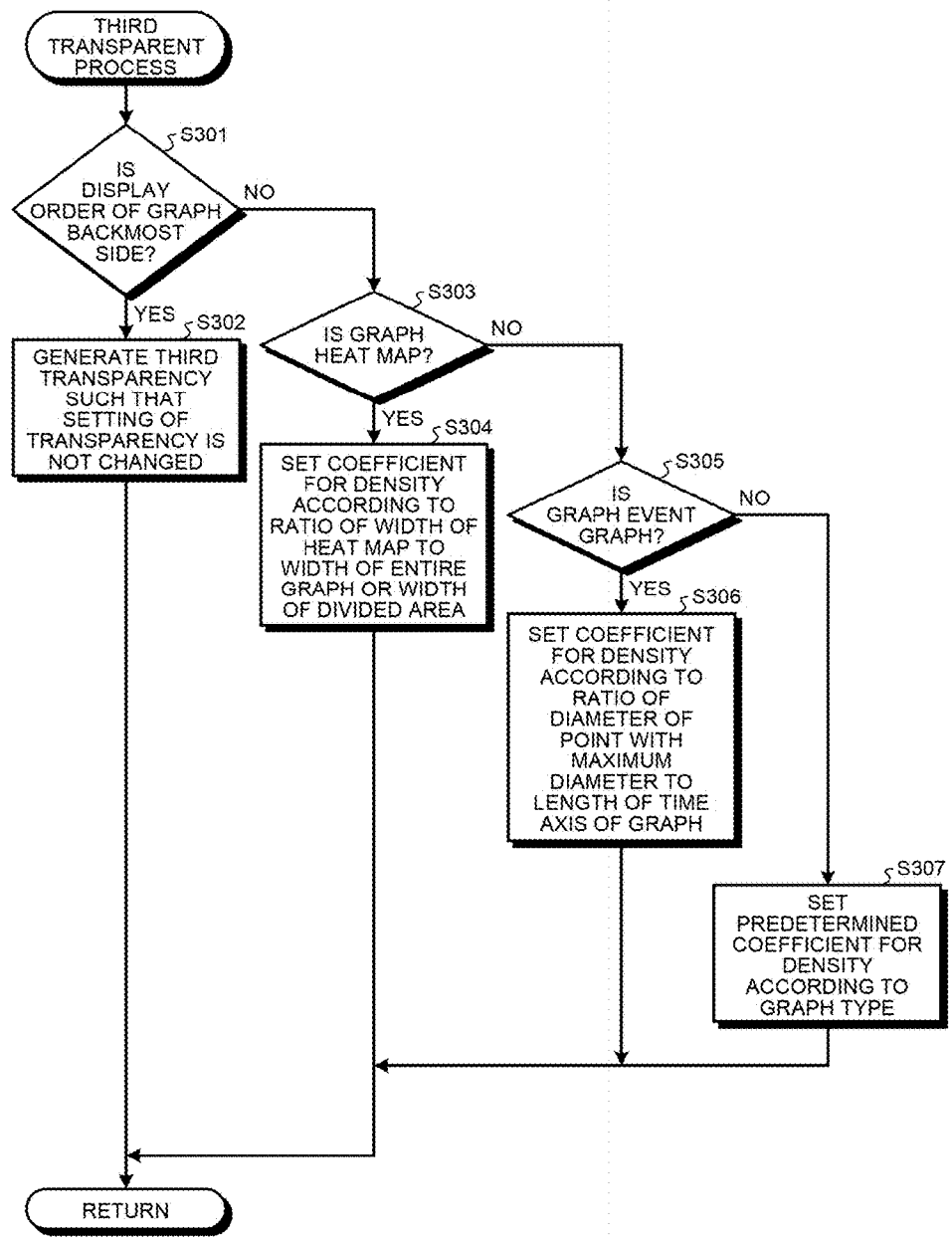
FIG. 13 is a flowchart illustrating an example of a third transparent process.

Referring back to FIG. 10, the transparency control unit 133 performs the third transparent process (Step S3). The third transparent process will be described with reference to FIG. 13. FIG. 13 is a flowchart illustrating an example of the third transparent process. The transparency control unit 133 determines whether a display order of a graph in which the second transparency is generated is the backmost side (Step S301). If the display order of the graph is the backmost side (YES at Step S301), the transparency control unit 133 generates the third transparency such that the setting of the transparency is not changed (Step S302).

If the display order of the graph does not indicate the backmost side (NO at Step S301), the transparency control unit 133 determines whether the graph is a heat map (Step S303). If the graph is a heat map (YES at Step S303), the transparency control unit 133 sets a coefficient for a density corresponding to the ratio of the width of the heat map to the width of the entire graph or the width of the divided area (Step S304), and returns the process.

If the graph is not a heat map (NO at Step S303), the transparency control unit 133 determines whether the graph is an event graph (Step S305). If the graph is an event graph (YES at Step S305), the transparency control unit 133 sets a coefficient for a density for each of the divided areas on the basis of the number of points in the event graph and the ratio of the diameter of the point to the length of the time axis of the divided area (Step S306), and returns the process. If the graph is not an event graph (NO at Step S305), the transparency control unit 133 sets a predetermined coefficient for a density according to the graph type (Step S307), and returns the process. Therefore, the display control device 100 can set the coefficient for a density used to generate the third transparency.

Referring back to FIG. 10, the transparency control unit 133 determines whether the second transparent process and the third transparent process are completed for all of the graph types (Step S4). If the second transparent process and the third transparent process are not completed (NO at Step S4), the transparency control unit 133 selects a next graph (Step S5), and returns to Step S2. If the second transparent process and the third transparent process are completed (YES at Step S4), the transparency control unit 133 calculates the density for each of the divided areas based on the coefficient for the density set in the third transparent process (Step S6).

The transparency control unit 133 generates the third transparency such that the transparency is set according to the maximum density among the divided areas (Step S7). The transparency control unit 133, upon completion of generation of the first to the third transparencies, calculates the final transparency for each graph based on the first to the third transparencies (Step S8). The transparency control unit 133 generates output data by setting the calculated final transparency in each graph data, and outputs the output data to the display control unit 134 (Step S9). The display control unit 134, upon input of the output data from the transparency control unit 133, generates a graph screen based on the input output data. The display control unit 134 outputs and displays the generated graph screen onto the display unit 111 (Step S10). Therefore, the display control device 100 can display a plurality of types of overlapping graphs in a visible manner. That is, the display control device 100 increases the transparency of a graph with an increase in the density of data contained in a plurality of types of overlapping graphs, so that it is possible to display the plurality of types of overlapping graphs in a visible manner.

As described above, the display control system 1 includes at least the display control device 100. The display control device 100, when displaying the first display component and the second display component such that at least parts of the display components overlap each other, increases the transparency of at least one of the first display component and the second display component in an overlapping portion according to a density of display contents contained in the first display components or a density of display contents contained in the second display components in the overlapping portion. Therefore, it is possible to display a plurality of types of overlapping objects in a visible manner.

Furthermore, the display control device 100 increases the transparency in the overlapping portion according to the types of the first display component and the second display component. Therefore, it is possible to display a plurality of types of overlapping objects in a more visible manner.

Moreover, in the display control device 100, each of the first display component and the second display component is the trace graph, the event graph, or the heat map. Therefore, even when a process, quantitative data, and event information are displayed in an associated and overlapping manner, it is possible to display the respective pieces of data in a visible manner.

Furthermore, in the display control device 100, it is assumed that when data corresponding to the first display component is traceability data and data corresponding to the second display component is quantitative data, the second display component is determined as a heat map. Therefore, it is possible to display a process and quantitative data in an associated and overlapping manner, and to display the respective pieces of data in a visible manner.

Moreover, in the display control device 100, the transparency of the second display component is set according to the ratio of the width of the heat map to the width of the entire display area or the width of a single divided area obtained by dividing a display area into a plurality of areas. Therefore, it is possible to display pieces of overlapping quantitative data in a more visible manner.

Furthermore, in the display control device 100, it is assumed that when data corresponding to the first display component is traceability data and data corresponding to the second display component is event data, the second display component is determined as an event graph. Therefore, it is possible to display a process and event information in an associated and overlapping manner, and to display the respective pieces of data in a visible manner.

Moreover, in the display control device 100, the transparency of the second display component is set according to the size of a point in the event graph. Therefore, it is possible to display pieces of overlapping event information in a more visible manner.

Furthermore, the display control device 100 calculates the density of the display contents contained in the first display component and the density of the display contents contained in the second display component for each of the divided areas obtained by dividing the display area into a plurality of areas. Therefore, it is possible to display a plurality of types of overlapping objects in a more visible manner.

Incidentally, in the embodiment, a case has been described in which the contents of the first display component or the second display component, that is, arrangement positions of pieces of data in each graph are not changed; however, it is not limited thereto. For example, when the time axis of a graph is changed, it may be possible to change the arrangement positions of pieces of data in each graph in accordance with the time axis, and controls the transparency of the first display component or the second display component in accordance with a density of the contents of the first display component or the second display component after the change. In other words, when the time axis of the graph is changed, arrangement of pieces of data in each graph is changed in accordance with the time axis, so that the density of the pieces of data (elements) in a predetermined area changes, and the display control device 100 controls the transparency of each graph according to the change in the density. That is, the display control device 100 changes the size of the divided area if the time axis of the graph is enlarged, so that the density of pieces of data in the divided area is reduced, the transparency of important data is reduced, and visibility is improved. Therefore, even when the time axis of the graph is changed, it is possible to display a plurality of types of overlapping objects in a visible manner.

As described above, the display control system 1 includes at least the display control device 100. The display control device 100 displays the first display component and the second display component. Furthermore, when an arrangement position of the first display component or the second display component is changed at a position at which at least parts of the first display component and the second display component overlap each other, the display control device 100 controls the transparency of the first display component or the second display component according to a density of contents contained in the first display component and a density of contents contained in the second display component in the overlapping portion. Therefore, even when the arrangement position of the display component is changed, it is possible to display a plurality of types of overlapping objects in a visible manner.

Furthermore, the display control device 100 changes the arrangement position based on a change in the time axis in a display area in which the first display component and the second display component are displayed. Therefore, even when the time axis of the graph is changed, it is possible to display a plurality of types of overlapping objects in a visible manner.

Incidentally, in the embodiment, a graph is represented in grayscale; however, it is not limited thereto. For example, a heat map representing a temperature may be displayed in a color-coded manner with blue, green, yellow, orange, red, and the like from the low temperature side to the high temperature side. Moreover, points in an event graph may be displayed with colors of red, green, blue, and the like according to the importance.

The components illustrated in the drawings need not necessarily be physically configured in the manner illustrated in the drawings. In other words, specific forms of distribution and integration of the components are not limited to those illustrated in the drawings, and all or part of the components may be functionally or physically distributed or integrated in arbitrary units depending on various loads or use conditions. For example, the transparency control unit 133 may be divided into a first transparency control unit, a second transparency control unit, and a third transparency control unit.

Furthermore, for each processing function performed by each apparatus, all or any part of the processing function may be implemented by a CPU (or a microcomputer, such as an MPU or a micro controller unit (MCU)). Moreover, all or any part of each processing function may be implemented by a program analyzed and executed by the CPU (or a micro computer, such as an MPU or an MCU)) or may be realized by hardware using wired logic.

Figure 14:
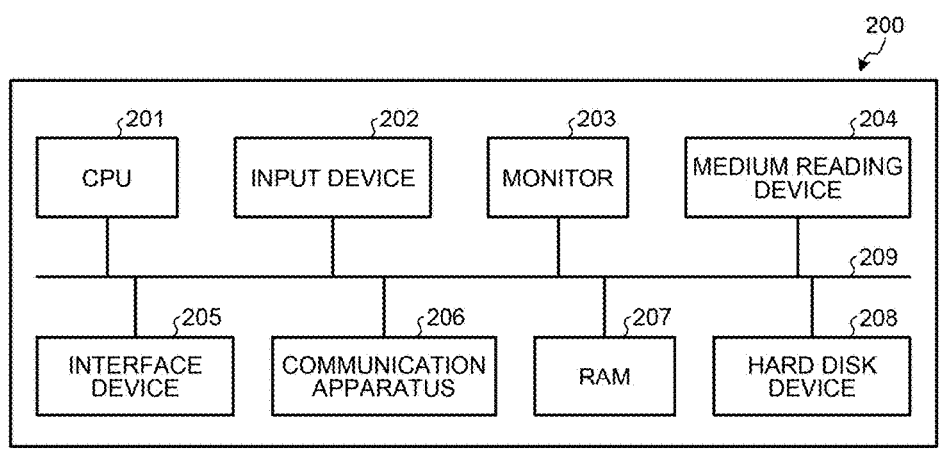
FIG. 14 is a diagram illustrating an example of a computer that executes a display control program.

Incidentally, various processes described in the embodiment as described above are realized by causing a computer to execute a program prepared in advance. Therefore, an example of the computer that executes a program with the same functions as those of the embodiment will be described below. FIG. 14 is a diagram illustrating an example of the computer that executes a display control program.

As illustrated in FIG. 14, a computer 200 includes a CPU 201 that executes various arithmetic processing, an input device 202 that receives input of data, and a monitor 203. Furthermore, the computer 200 includes a medium reading device 204 that reads a program and the like from a storage medium, an interface device 205 to connect to various apparatuses, and a communication apparatus 206 to connect to other information processing apparatuses by wire or wireless. Moreover, the computer 200 includes a RAM 207 for temporarily storing various types of information and a hard disk device 208. Furthermore, each of the devices 201 to 208 are connected to a bus 209.

The hard disk device 208 stores therein a display control program having the same functions as those of the processing unit of each of the accepting unit 131, the generating unit 132, the transparency control unit 133, and the display control unit 134 illustrated in FIG. 1. Furthermore, the hard disk device 208 stores therein various types of data to implement the log storage unit 121, the transparency storage unit 122, and the display control program. The input device 202 accepts input of various types of information, such as operation information or management information, from an administrator of the computer 200, for example. The monitor 203 displays a graph screen, a screen for the management information, and various screens to the administrator of the computer 200, for example. The interface device 205 is connected to a printing device, for example. The communication apparatus 206 has the same functions as those of the communication unit 110 illustrated in FIG. 1, is connected to a network (not illustrated), and exchanges various types of information with various apparatuses, for example.

The CPU 201 reads various programs stored in the hard disk device 208, loads the programs onto the RAM 207, and executes the programs to perform various processes. Furthermore, with the programs, the computer 200 can be caused to function as the accepting unit 131, the generating unit 132, the transparency control unit 133, and the display control unit 134 illustrated in FIG. 1.

Incidentally, the above-described display control program need not necessarily be stored in the hard disk device 208. For example, the computer 200 may read and execute a program stored in a storage medium that the computer 200 can read. Examples of the storage medium that the computer 200 can read include a portable recording medium, such as a compact disc-ROM (CD-ROM), a digital versatile disk (DVD), and a universal serial bus (USB) memory, a semiconductor memory, such as a flash memory, and a hard disk drive. Furthermore, it may be possible to store the display control program in an apparatus connected to a public line, the Internet, a local area network (LAN), or the like, and cause the computer 200 to read and execute the display control program.

It is possible to display a plurality of types of overlapping objects in a visible manner.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A display control system comprising:
   at least a display control device including
   a memory; and
   a processor coupled to the memory to:
   display a first display component and a second display component; and
   increase, when displaying the first display component and the second display component such that at least parts of the first display component and the second display component overlap each other, a transparency of at least one of the first display component and the second display component in an overlapping portion, where the first display component and the second display component overlap with each other, according to one of a density of display contents contained in the first display component and a density of display contents contained in the second display component in the overlapping portion, wherein
   the transparency of the second display component is set according to a ratio of a width of a heat map to one of a width of an entire display area and a width of a single divided area among divided areas that are obtained by dividing the display area into a plurality of areas.

2. The display control system according to claim 1, wherein the processor increases the transparency in the overlapping portion according to types of the first display component and the second display component.

3. The display control system according to claim 1, wherein each of the first display component and the second display component is any of a trace graph, an event graph, and a heat map.

4. The display control system according to claim 1, wherein when data corresponding to the first display component is traceability data and data corresponding to the second display component is quantitative data, the second display component is determined as a heat map.

5. The display control system according to claim 1, wherein when data corresponding to the first display component is traceability data and data corresponding to the second display component is event data, the second display component is determined as an event graph.

6. The display control system according to claim 5, wherein the transparency of the second display component is set according to a size of a point in the event graph.

7. The display control system according to claim 1, wherein the density of the display contents contained in the first display component or the density of the display contents contained in the second display component is calculated for each of divided areas that are obtained by dividing a display area into a plurality of areas.

8. A display control system comprising:
   at least a display control device including
   a memory; and
   a processor coupled to the memory to:
   display a first display component and a second display component; and
   increase, when an arrangement position of one of the first display component and the second display component is changed at a position at which at least parts of the first display component and the second display component overlap each other, control a transparency of one of the first display component and the second display component according to a density of contents contained in the first display component and a density of contents contained in the second display component in an overlapping portion, where the first display component and the second display component overlap with each other, wherein
the transparency of the second display component is set according to a ratio of a width of a heat map to one of a width of an entire display area and a width of a single divided area among divided areas that are obtained by dividing the display area into a plurality of areas.

9. The display control system according to claim 8, wherein the arrangement position is changed based on a change in a time axis of a display area in which the first display component and the second display component are displayed.

* * * * *